(No Model.)
A. J. KNIGHT.
FIRE EXTINGUISHER.
No. 589,990. Patented Sept. 14, 1897.
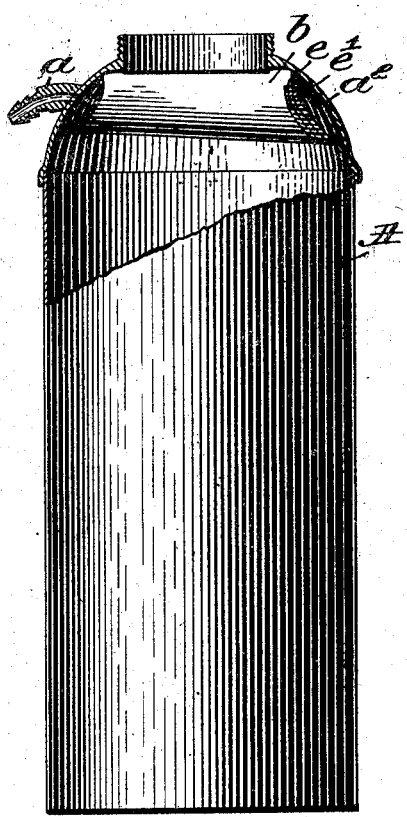
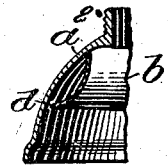
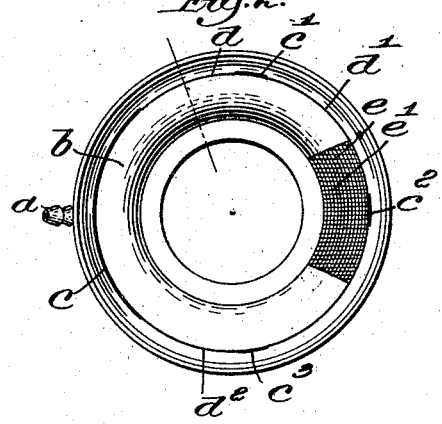
Witnesses:
Fred S. Greenleaf
Edward W. Allen
Inventor:
Alfred J. Knight
by Crosby & Gregory, attys.

UNITED STATES PATENT OFFICE.

ALFRED J. KNIGHT, OF BOSTON, MASSACHUSETTS.

FIRE-EXTINGUISHER.

SPECIFICATION forming part of Letters Patent No. 589,990, dated September 14, 1897.

Application filed June 5, 1897. Serial No. 639,496. (No model.)

*To all whom it may concern:*

Be it known that I, ALFRED J. KNIGHT, of Boston, county of Suffolk, State of Massachusetts, have invented Improvements in Fire-Extinguishers, of which the following description, in connection with the accompanying drawings, is a specification, like letters on the drawings representing like parts.

Fire-extinguishers composed of cylinders or chambers containing chemicals which when the cylinder or chamber is inverted will cause the chemicals to mix and act are frequently carried on railway-cars, on shipboard, and on wheeled vehicles, and in motion the liquid in the cylinder, as the cylinder sways from side to side under motion, frequently enters the usual outlet for it and escapes on the floor or other place where the cylinder stands, which is very objectionable. This accidental slopping over of the water due to swaying of the cylinder very seriously limits the use of this class of extinguisher, and to do away with this difficulty is the object of this present invention.

With my extinguisher as improved the cylinder must be reversed before the liquid can escape.

In my invention the interior of the head of the cylinder has applied to it a ring-conduit which is open at one side, substantially opposite the point of attachment to it of the exit-pipe. The liquid when it escapes from the exit-pipe must enter it through the conduit, this being effected only when the cylinder is reversed. This conduit has its lower edge, considering the cylinder as right side up, arranged below the outlet-opening leading to the discharge-pipe, and for a part of the circumference of the conduit at a distance from said outlet the lower edge of the conduit is not soldered tightly to the interior of the cylinder and liquid-escapes are left, so that any liquid slopping into the conduit at its entrance shall pass from the conduit back into the cylinder through said escapes.

Figure 1, in elevation, shows a fire-extinguisher cylinder partially broken out at its upper end to disclose my improvements; Fig. 2, a view looking into the top of the cylinder. Fig. 3 is a section taken through the cylinder and conduit where its lower edge is not soldered to the cylinder.

The cylinder A is and may be common to any usual fire-extinguisher. The cylinder has an outlet or discharge pipe $a$, made in the top of the cylinder. This cylinder will be closed at top in usual manner and will contain liquid and usual chemicals, all in usual manner.

Inside the head $a'$ I apply a conduit $b$, it being shown as a piece of metal concaved or of such other shape that when applied to the interior of the head it will leave between its inner side and the said head a conduit, the discharge-pipe leading into this conduit about midway of its height. The upper edge of the piece of metal referred to is soldered or secured to the interior of the head, but at its lower edge the said piece of metal is soldered firmly and water-tight to the head at the point $c$, where the said soldered joint is shown by heavy black line, and at two or three other places, as $c'$ $c^2$ $c^3$, thus leaving open spaces at $d$ $d'$ $d^2$. The piece of metal $b$ is cut out to leave an inlet at $e$, and, preferably, the inlet is provided with a reticulated screen.

In use suppose the cylinder to be standing upright on a shelf and the shelf or other support being in motion. The liquid splashing about in the upper part of the cylinder will at times enter the conduit at the inlet and the liquid will run about in the said conduit, but it will not go as far as the outlet leading to the pipe $a$, for it will escape through the escape-passages $d$ $d'$ $d^2$, one or more.

In no case can there remain in the conduit sufficient liquid to fill it from the lower edge of the piece of metal to a height sufficient to escape from the outlet into the pipe $a$.

With the extinguisher as improved by me the liquid which may enter the conduit due to swaying of the cylinder will not escape from the outlet $a$, but should the cylinder be inverted the liquid will then have a free passage into the conduit and escape from the pipe $a$.

The lower circular edge of the conduit is shown at the right, viewing Fig. 1, as located farther down from the upper end of the cylinder at that side thereof substantially diametrically opposite the outlet, such construction reducing the liability of any liquid which may possibly splash into the conduit entering the outlet $a$.

By the term "upper end of the cylinder" as used in the claims following I mean the rounded or that part of the cylinder which when the extinguisher is occupying its normal position preparatory to being used is uppermost.

Having described my invention, what I claim as new, and desire to secure by Letters Patent, is—

1. In a fire-extinguisher, a cylinder provided at its upper end with an outlet-pipe, and containing within its upper end a circular conduit having its bottom sloping downward and outward, and having its lower edge detached from the interior of said cylinder at a point distant from the said outlet to form a drip-passage, substantially as described.

2. In a fire-extinguisher, a cylinder provided within its upper end with a conduit in the form of an annulus adjacent the sides of the cylinder and forming an annular chamber therewith, said conduit being detached at its lower edge for a part of its length from the interior of said cylinder so as to leave a space or open drip-passage, and an outlet-pipe in said cylinder and communicating with the said conduit above the lowermost part of the latter, substantially as described.

3. In a fire-extinguisher, the combination with a cylinder having an outlet-pipe, of an annular conduit inclosing said outlet, said conduit being in the form of a strip bent at its upper and lower edges to approach the cylinder, whereby an annular open passage is formed between said strip and cylinder to prevent the splashing of the chemicals in the cylinder out of said outlet-pipe, said conduit at its lower edge being inclined away from said outlet whereby the tendency of the liquid which may splash therein is to run away from the outlet, substantially as described.

4. In a fire-extinguisher, the combination with a cylinder having an outlet-pipe, of an annular conduit inclosing said outlet, said conduit being in the form of a strip bent at its upper and lower edges to approach the cylinder, whereby an annular open passage is formed between said strip and cylinder to prevent the splashing of the chemicals in the cylinder out of said outlet-pipe, said conduit at its lower edge being inclined away from said outlet whereby the tendency of the liquid which may splash therein is to run away from the outlet, and a reticulated opening provided in said conduit at its lowermost side, substantially as described.

5. In a fire-extinguisher, the combination with a cylinder having an outlet-pipe, of an annular conduit inclosing said outlet, said conduit being in the form of a strip bent at its upper and lower edges to approach the cylinder, whereby an annular open passage is formed between said strip and cylinder to prevent the splashing of the chemicals in the cylinder out of said outlet-pipe, said conduit at its lower edge being inclined away from said outlet whereby the tendency of the liquid which may splash therein is to run away from the outlet, said strip being secured to the cylinder throughout its upper edge and at portions only of its lower edge, the unsecured portions of said lower edge being slightly removed from the adjacent surface of the cylinder to provide drip-openings at said point, substantially as described.

In testimony whereof I have signed my name to this specification in the presence of two subscribing witnesses.

ALFRED J. KNIGHT.

Witnesses:
GEO. W. GREGORY,
MARGARET A. DUNN.